Sept. 26, 1939.  W. R. GRISWOLD  2,174,262
METHOD OF MAKING BEARINGS
Original Filed March 20, 1935   2 Sheets-Sheet 1

Inventor:
Walter R. Griswold
By Sibbetts & Hart
Attorneys

Sept. 26, 1939.   W. R. GRISWOLD   2,174,262
METHOD OF MAKING BEARINGS
Original Filed March 20, 1935   2 Sheets-Sheet 2

Inventor:
Walter R. Griswold

By Sibbitts & Hurt
Attorneys

Patented Sept. 26, 1939

2,174,262

UNITED STATES PATENT OFFICE 2,174,262

METHOD OF MAKING BEARINGS

Walter R. Griswold, Detroit, Mich., assignor to Packard Motor Car Company, Detroit, Mich., a corporation of Michigan Original application March 20, 1935, Serial No. 11,932. Divided and this application December 14, 1938, Serial No. 245,751

4 Claims. (Cl. 29—148.4)

This invention relates to the mounting of gear elements and is particularly useful in a transmission of the general type disclosed in Patent 1,960,357, dated May 29, 1934.

This application is a division of application Serial No. 11,932, filed March 20, 1935.

In automobile transmissions of the type shown in said Serial No. 11,932 the gears are preferably of the helical type designed for quiet operation. Quietness in the best of gears cannot be obtained without an accurate mounting of the gears and sufficient strength in the shafts to insure against undue springing. If ball bearings are used they must be large enough to withstand the full load to which they are likely to be subjected and it is well known that a full row of balls in a bearing will take a heavier load than a partial row with cages spacing the balls or that smaller balls may be used if a full row can be employed.

It has been found that ball bearings may be preloaded somewhat and, of course, a full row of balls will take a pre-load better than a partial row of balls with spacers. It has also been found that pre-loaded ball bearings will retain a gear element more closely in concentric relation with the shaft on which it is mounted. In previous transmissions where ball or roller bearings have been used to support a gear between splined portions of one of the transmission shafts, it has been found necessary to use a sleeve over one of the splined portions of the shaft in order to reach to one end of the shaft to clamp the bearings in position, and of course this sleeve must also be splined, thus adding to the complication and expense and necessarily decreasing the size of the shaft at that splined portion or increasing the size of the element sliding on the splined sleeve, neither of which is at all desirable.

One of the objects of the present invention is to provide a method of mounting a gear element on a shaft of a transmission so that there may be no material weakening of the shaft by reason of the retaining means.

Another object of the invention is to provide a method of mounting a gear on a shaft so that the clamping means for the mounting will connect directly with the shaft adjacent the mounting.

Another object of the invention is to provide a method for rotatably mounting a gear on a shaft so that the mounting, that is, the balls in the races, may be pre-loaded by connection with the shaft adjacent the mounting itself.

Another object of the invention is to provide a method for rotatably mounting a gear on a shaft so that the mounting will be pre-loaded and the clamping device will be embedded in the shaft itself adjacent the mounting.

Another object of the invention is to provide a method for rotatably mounting a gear on a shaft so that the mounting will connect directly with the shaft and so that the mounting means may thereafter be adjustable on the shaft.

Other objects of the invention will appear from the following description taken in connection with the drawings, which form a part of this specification, and in which.

Figures 1, 2, 3, 4:
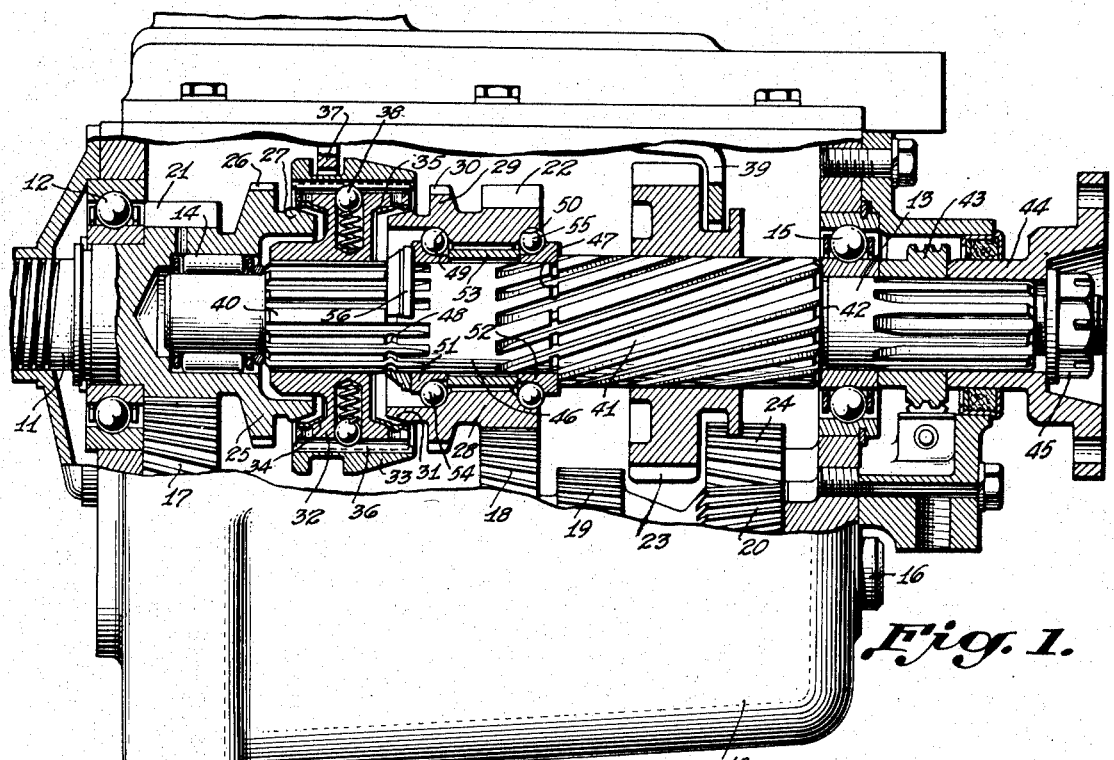
Figure 1 is partly a side view and partly a longitudinal sectional view through a motor vehicle transmission embodying a construction made in accordance with the method of this invention.
Figure 2 is a sectional view showing a gear and its mounting, with the clamping ring thereof in position before it is pressed into the retaining groove.
Figure 3 is a section on the line 3—3 of Figure 2.
Figure 4 is a view somewhat similar to Figure 2 illustrating another form of gear mounting.

Referring particularly to the construction shown in Figs. 1, 2, and 3, 10 represents a transmission gear casing of the usual type, 11 is the driving shaft of the transmission mounted in the usual type of ball bearing 12 in the front end of the casing, and 13 is the driven shaft aligned with the driving shaft and having its forward end mounted in a roller bearing 14 in the adjacent end of the driving shaft. The rear end of the driven shaft 13 is mounted in the usual ball bearing 15. There is a countershaft 16 upon which is rotatably mounted a nest of gears comprising gears 17, 18, 19, and 20. Gear 17 constantly meshes with a gear 21 on the end of the driving shaft 11, gear 18 constantly meshes with a gear 22 which forms part of a gear element rotatably mounted on the driven shaft 13 as will be hereinafter more particularly described. Gear 19 meshes with a gear 23 which slides on a splined portion of the driven shaft 13, and this sliding gear 23 may also mesh with a reverse gear 24 mounted for constant mesh with gear 20. The gear 23 is shown in neutral position between the gears 19 and 24.

The driving shaft 11 is also formed with a clutch portion 25 having clutch teeth 26 and a conical clutch portion 27, and spaced therefrom and surrounding the driven shaft 13 is a gear element 28 upon which the gear 22 is formed and which also is provided with a clutch element 29 having clutch teeth 30 and a conical clutch portion 31. Mounted between the clutch elements 25 and 29 is a synchronizing mechanism which synchronizes the speed of the shaft 11 or the speed of the gear element 22 with the speed of the driven shaft 13 before the respective clutch element is connected to the driven shaft. This mechanism comprises a sliding clutch ring 32 keyed to the driven shaft 13 and a positive clutch sleeve 33 sliding and keyed thereon. The clutch ring 32 has cone clutch surfaces 34 and 35 which cooperate with the clutch portions 27 and 31, respectively, and the internal teeth 36 of the sleeve 33 cooperate with the clutch teeth 26 and 30.

A shifter yoke 37 moves the sleeve 33 and a spring pressed ball 38 retards the movement thereof as the clutch cones engage to synchronize the speeds. There is also a shifter yoke 39 for shifting the sliding gear 23.

The operating or driven shaft 13 is formed with a portion 40 having straight splines upon which the clutch ring 32 may slide in its synchronizing movements. The shaft 13 is also formed with a portion 41 having helical splines upon which the gear 23 slides, these splines corresponding to the angle of the teeth of the gears 19, 23, and 24 so that meshing may be facilitated. At the rear end of the splined portion 41 the shaft 13 is formed with a shoulder 42 against which the inner race of the bearing 15 abuts. A speedometer drive gear 43 is keyed to the shaft 13 beyond the gear 15, and a universal joint 44 is keyed to the shaft. A nut 45 is threaded on the end of the shaft 13 and clamps the parts against the shoulder 42, thus retaining the parts on the shaft and retaining the shaft in endwise position in the casing.

The splined portions 40 and 41 of the shaft 13 are spaced relative to each other and between them is a bearing portion 46 for supporting the gear element 28. The portions 40 and 46 of the shaft are shown as of the same diameter but they are smaller than the portion 41, thus forming a shoulder 47 between the portions 41 and 46. Spaced from the shoulder 47 and between the portions 40 and 46, the shaft 13 is formed with an annular groove 48. Thus the bearing portion 46 may be defined as that part of the shaft between the shoulder 47 and the annular groove 48. In cutting the splines of the portions 40 and 41 the cutter will usually run over the groove 48 and shoulder 47 as shown in the drawings but this is merely a tapering off of the splines and serves no purpose on the bearing portion of the shaft.

The gear element 28 is formed interiorly with two separated ball races 49 and 50, these races being formed directly in the element itself so that the gear may be made small relative to the shaft diameter. Opposed ball races are formed in race elements 51 and 52 and these elements may be extended so that they meet or they may be provided as shown, with a spacer 53. With the races formed as shown, a full row of balls 54 may be provided between the races 49 and 51 and a full row of balls 55 may be provided between the races 50 and 52. This full row of balls may be seen particularly in Fig. 3. The races in the gear element 28, the balls, the races in the elements 51 and 52, and the spacer 53 are so formed and proportioned that when the race 51 is pressed firmly towards the shoulder 47 the bearings will be pre-loaded to just the right extent to firmly retain the gear element 28 in its position on the shaft 13 and yet permit it to rotate readily under load. This is obtained by providing a slight clearance when the parts are brought loosely together, this clearance being approximately two-thousandths of an inch. Then when the inner races and the spacer 53 are clamped together this two-thousandths will be taken up and the bearing properly pre-loaded.

To retain the parts of the mounting in position on the shaft a connection is made with the shaft on the mounting itself. This is shown as in the form of a ring 56, the inside diameter of which, when it is placed on the shaft as shown in Fig. 2, is such that it must be pressed in place. In other words, the ring 56 is a pressed fit on the left hand end of the bearing portion of the shaft 13 and as it is pressed in place to the position shown in Fig. 2, the clearance in the bearing parts is taken up and the race elements 51 and 52 and the spacer 53 are clamped against the shoulder 47, thus pre-loading the bearing as above described. In this position the ring 56 has a portion 57 directly over the annular groove 48 in the shaft 13. Then following this pressing operation the ring portion 57 is subjected to a rolling or peening operation which forces the portion 57 into the groove 48 as shown in Fig. 1 so that all of the parts of the mounting are retained on the shaft. This rolling or peening operation is made possible by reason of the pressed fit of the ring 56 on the shaft.

With this method of securing the mounting in place the shaft portions 40 and 46 may be made of the same size and neither has to be made larger than is necessary for the load imposed upon it. Also, the construction retains the mounting on the shaft without the necessity of a sleeve extending to the end of the shaft. Also, this construction retains the bearings in pre-loaded condition throughout the life of the bearings and thus the gears are maintained in line and thereby produce quiet operation.

Referring to the construction shown in Fig. 4, the mounting is applied interiorly of a support. Thus the support 60 has a shoulder 61 and an annular groove 62 spaced therefrom. A gear or similar element 63 is mounted for rotation relative to the support on two full rows of ball bearings 64, 65. Spaced races 66 and 67 are formed directly in the element 63 and races 68 and 69 are mounted in the support 60 with a spacer 70 between them. The race 69 rests against the shoulder 61 and these parts are so proportioned that there is slight clearance when they are assembled lightly together. When the races 68 and 69 and the spacer 70 are clamped against the shoulder 61, the clearance is taken up and the bearing is thus pre-loaded.

For securing the mounting in position a ring 71 is pressed into the support 60 against the race 68, thus taking up the clearance and pre-loading the bearing. A portion 72 of the ring 71 is in line with the groove 62 and this portion is then rolled into the groove, thus retaining the bearing in position.

When the element 63 is an internal gear it may have meshing with it a pinion 73 on a shaft 74 for any purpose desired.

Figure 5:
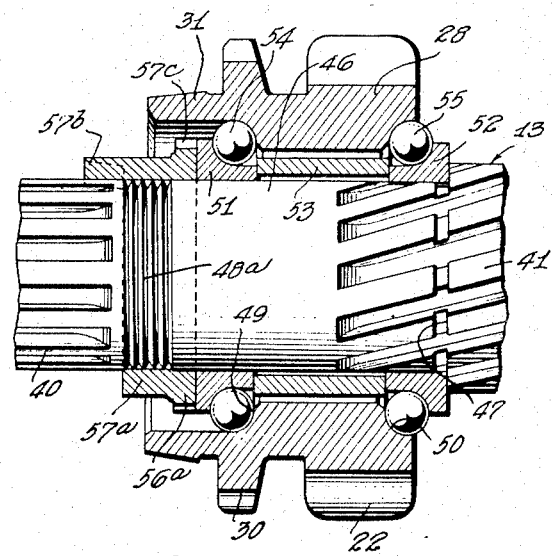
Figure 5 is a view also similar to Figure 2 showing another form of connection between the clamping ring and the shaft with the ring in position before being pressed into the threaded groove.
Figure 6:
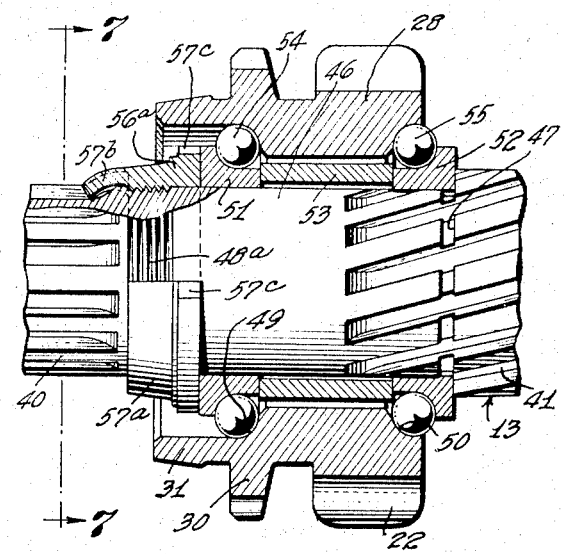
Figure 6 is a view similar to Figure 5 with the clamping ring in its finished and adjusted position.
Figure 7:
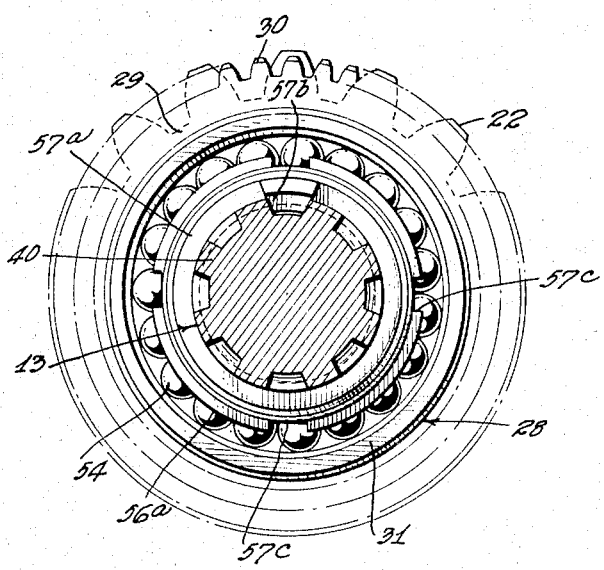
Figure 7 is a section on the line 7—7 of Figure 6.

In the construction shown in Figs. 5, 6, and 7 the clamping ring is made adjustable so that after it is rolled into the groove it may be adjusted to further tighten the bearing elements. In these figures the shaft 13, the gear element 28, and the various bearing parts have the same reference numerals as in the construction shown in Fig. 1. But the shaft 13 instead of being formed with a groove 48 as shown in Fig. 1 is formed with a thread 48a in a plain part of the bearing portion 46 of the shaft. The shaft 13 is shown as of the same diameter on both sides of the threads 48a so that of course it would be impossible to thread a threaded ring on to the threaded portion of the shaft. To cut down the splined portion 40 of the shaft 13 would weaken the shaft or to make the bearing portion 46 larger would mean that the bearings and the gear element 28 would have to be made larger and this would mean having to enlarge all of the other gears in the gear casing.

So in this invention the clamping ring 56a is made large enough to fit loosely over the splined portion 40 and on to the bearing portion 46 of the shaft against the race element 51. A portion 57a of the ring 56a is over the threaded portion of the shaft and there is also a tongue 57b extending from the portion 57a. With the ring 56a in this position and being held against turning by the tongue 57b, as by pressing the tongue into one of the grooves of the splined portion 40, the portion 57a of the ring is cold pressed into the grooves of the threads 48a so that the ring is thereby threaded on the shaft. Then by bending the tongue 57b out of the locking groove the ring 56a may be turned by the spanner teeth 57c to tighten the ring against the race element 51, thereby clamping the bearing parts in place. When so tightened the ring 56a may be retained in position by pressing the tongue 57b into one of the locking grooves.

It will be understood that various forms of the invention other than those described above may be used without departing from the spirit or scope of the invention.

What I claim is:

1. The method of rotatably mounting a gear upon a shaft consisting of forming the gear with spaced ball races, forming the shaft with a shoulder and with an annular groove spaced from the shoulder, assembling spaced races and balls and the gear on the shaft with one spaced race against said shoulder, assembling a ring by a pressed fit on the shaft and against the other spaced race with a portion of said ring surrounding said annular groove, and spinning said portion of the ring into said groove to pre-load the balls and to clamp the spaced races permanently on the shaft.

2. The method of rotatably mounting a gear upon a shaft consisting of forming the gear with spaced ball races, forming the shaft with a shoulder and with an annular groove spaced from the shoulder, assembling spaced races and balls and the gear on the shaft with one spaced race against said shoulder and with the spacing such that a predetermined pre-load on the balls will be obtained when the races and spacer are clamped against said shoulder, pressing a ring on the shaft against the other spaced race with a portion of the ring surrounding said groove, and spinning said ring into said groove to clamp the spaced races permanently on the shaft.

3. The method of mounting an adjusting ring on a shaft for adjustably securing the bearings of a gear element comprising forming the shaft with threads thereon between shaft portions of equal diameter, placing a ring on said shaft surrounding the threaded portion of the shaft, and cold pressing a portion of said ring into the spaces between the threads whereby the ring is thereafter adjustable on the shaft for the purpose described.

4. The method of rotatably mounting a gear upon a shaft consisting of assembling spaced races and balls and the gear with relation to the shaft, with one spaced race immovably held, assembling a ring by a pressed fit on the shaft and against the other spaced race with a portion of said ring surrounding an annular groove in the shaft, and spinning said portion of the said ring into said groove to preload the balls and to clamp the spaced races relatively to each other.

WALTER R. GRISWOLD.